(12) United States Patent
Zafarana

(10) Patent No.: US 11,563,369 B2
(45) Date of Patent: Jan. 24, 2023

(54) TRANSMITTING POWER STAGE PARAMETERS FROM A VOLTAGE REGULATOR TO POWER STAGES

(71) Applicant: SEMICONDUCTOR COMPONENTS INDUSTRIES, LLC, Phoenix, AZ (US)

(72) Inventor: Alessandro Zafarana, Milan (IT)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 468 days.

(21) Appl. No.: 16/855,120

(22) Filed: Apr. 22, 2020

(65) Prior Publication Data
US 2021/0336528 A1 Oct. 28, 2021

(51) Int. Cl.
*H02M 1/32* (2007.01)
*H02M 1/00* (2006.01)

(52) U.S. Cl.
CPC ............ *H02M 1/32* (2013.01); *H02M 1/0009* (2021.05); *H02M 1/0012* (2021.05)

(58) Field of Classification Search
CPC ..... H02M 1/32; H02M 1/0009; H02M 1/0012
See application file for complete search history.

(56) References Cited

U.S. PATENT DOCUMENTS

| | | | |
|---|---|---|---|
| 9,647,543 B2 | 5/2017 | Luo et al. | |
| 2004/0046535 A1* | 3/2004 | Duffy | H02M 3/157 323/283 |
| 2006/0172783 A1 | 8/2006 | Leung et al. | |
| 2011/0193542 A1* | 8/2011 | Kwok | H05B 45/46 323/284 |
| 2017/0063239 A1* | 3/2017 | Wu | H02M 3/1584 |
| 2017/0115725 A1* | 4/2017 | Luo | G06F 1/3296 |
| 2018/0269786 A1* | 9/2018 | Mirjafari | H02M 3/1584 |
| 2020/0021101 A1* | 1/2020 | Giacolini | H02J 3/383 |
| 2020/0076416 A1* | 3/2020 | Bang | H03K 17/08122 |
| 2020/0145017 A1* | 5/2020 | Pardoen | H03F 1/0211 |

OTHER PUBLICATIONS

Semiconductor Components Industries, LLC, "FDMF3035 Smart Power Stage (SPS) Module", Aug. 2018, rev. 3.
Semiconductor Components Industries, LLC, "FDMF3170 Smart Power Stage (SPS) Modules with Integrated Current and Temperature Monitors", Nov. 2016, rev. 1.2.

* cited by examiner

*Primary Examiner* — Rafael O De Leon Domenech
(74) *Attorney, Agent, or Firm* — Brake Hughes Bellermann LLP

(57) ABSTRACT

According to an aspect, a power supply system includes a plurality of power stages including a first power stage and a second power stage. The power supply system includes a voltage regulator connected to the first power stage and the second power stage. The voltage regulator is configured to detect an analog temperature signal from at least one of the first power stage and the second power stage via a communication line. The analog temperature signal is detected within a first voltage range. The voltage regulator is configured to transmit a digital bit stream to the first power stage and the second power stage via the communication line. The digital bit stream includes one or more programmable power stage parameters. The digital bit stream has digital levels within a second voltage range.

20 Claims, 11 Drawing Sheets

TRANSMITTING POWER STAGE PARAMETERS FROM A VOLTAGE REGULATOR TO POWER STAGES

BACKGROUND

Power stages may provide several types of protection such as undervoltage protection, overvoltage protection, overcurrent protection, and overtemperature protection, etc. Also, a voltage regulator may monitor various aspects of the power stages such as the current delivered, the temperature of integrated circuits, the power input bus, etc. The parameters (including thresholds) for the circuit protections and/or monitoring aspects can be application specific and may vary from product to product. In some conventional approaches, these parameters (or some of these parameters) are stored (e.g., embedded) at the individual power stages at production, thereby causing any subsequent customizations including modification of these parameters to fit another type of application relatively difficult.

SUMMARY

According to an aspect, a power supply system includes a plurality of power stages including a first power stage and a second power stage. The power supply system includes a voltage regulator connected to the first power stage and the second power stage. The voltage regulator is configured to detect an analog temperature signal from at least one of the first power stage and the second power stage via a communication line. The analog temperature signal is detected within a first voltage range. The voltage regulator is configured to transmit a digital bit stream to the first power stage and the second power stage via the communication line. The digital bit stream includes one or more programmable power stage parameters. The digital bit stream has digital levels within a second voltage range. The second voltage range is different from the first voltage range.

According to some aspect, the power supply system may include one or more of the following features (or any combination thereof). The first power stage includes a temperature pin coupled to the communication line. The first power stage includes a first switch coupled to the temperature pin, where the first power stage is configured to transmit a negative acknowledgement message to the voltage regulator by activating the first switch to cause a voltage on the communication line to be within a third voltage range. The third voltage range may be less than the first voltage range. The first power stage includes a second switch coupled to the temperature pin, where the first power stage is configured to transmit a fault condition message to the voltage regulator by activating the second switch to cause a voltage on the communication line to be within a fourth voltage range. The fourth voltage range may be higher than the second voltage range. The analog temperature signal corresponds to a temperature of the first power stage in response to the temperature of the first power stage being higher than a temperature of the second power stage. The voltage regulator includes a digital integrated circuit having a processor and a memory, where the memory is configured to store one or more configuration files having programmable power stage parameters. The voltage regulator includes an electronic timer, where the electronic timer is configured to set a wait time period in response to the digital bit stream being transmitted. The digital integrated circuit is configured to re-transmit the digital bit stream in response to receipt of a negative acknowledgment message on the communication line during the wait time period. The digital integrated circuit is configured to monitor the analog temperature signal on the communication line during the wait time period. The voltage regulator is configured to interrupt detection of the analog temperature signal on the communication line, transmit the digital bit stream to the plurality of power stages via the communication line, and resume the detection of the analog temperature signal.

According to an aspect, a power supply system includes a plurality of power stages, and a voltage regulator connected to the plurality of power stages. The voltage regulator is configured to detect an analog temperature signal from the plurality of power stages via a communication line. The voltage regulator is configured to transmit a digital bit stream to the plurality of power stages via the communication line. The digital bit stream includes one or more programmable power stage parameters.

According to some aspects, the power supply system may include any of the above/below features (or any combination thereof). The voltage regulator is configured to transmit the digital bit stream with digital logic levels within a voltage range different from a voltage range used to detect the analog temperature signal. The voltage regulator is configured to transmit the digital bit stream before the plurality of power stages initiate a power stage start-up operation. The voltage regulator is configured to interrupt detection of the analog temperature signal on the communication line, transmit the digital bit stream to the plurality of power stages via the communication line, and resume the detection of the analog temperature signal. The voltage regulator is configured to detect the analog temperature signal by detecting a voltage level on the communication line. The voltage regulator is configured to re-transmit the digital bit stream to a power stage of the plurality of power stages in response to receipt of a negative acknowledgement message from the power stage during a wait time period set by an electronic timer. A power stage of the plurality of power stages is configured to transmit a negative acknowledgement message by decreasing a voltage level on the communication line to be less than a threshold level for a period of time. The power stage is configured to transmit the negative acknowledgement message in response to receipt of a portion of the digital bit stream, where a length of the period of time indicates identification information of the power stage.

According to an aspect, a method for transmitting a programmable power stage parameter in a power supply system includes transmitting, by a voltage regulator, a digital bit stream to a plurality of power stages via a communication line. The digital bit stream includes one or more programmable power stage parameters. The digital bit stream has digital levels within a first voltage range. The method includes detecting, by the voltage regulator, an analog temperature signal from the plurality of power stages via the communication line. The analog temperature signal is detected within a second voltage range. The second voltage range is different from the first voltage range.

According to some aspects, the method may include one or more the above/below features (or any combination thereof). The method may include setting, by the voltage regulator, a wait time period in response to the digital bit stream being transmitted, detecting, by the voltage regulator, the analog temperature signal on the communication line during the wait time period, detecting, by the voltage regulator, a negative acknowledgement message on the communication line during the wait time period, and re-transmitting, by the voltage regulator, the digital bit stream to the plurality of power stages in response to receipt of the negative acknowledgement message. The detecting the negative acknowledgement on the communication line may include detecting that a voltage on the communication line is within a third voltage range. The digital bit stream is transmitted during operation of the plurality of power stages.

DETAILED DESCRIPTION

Figure 1A:
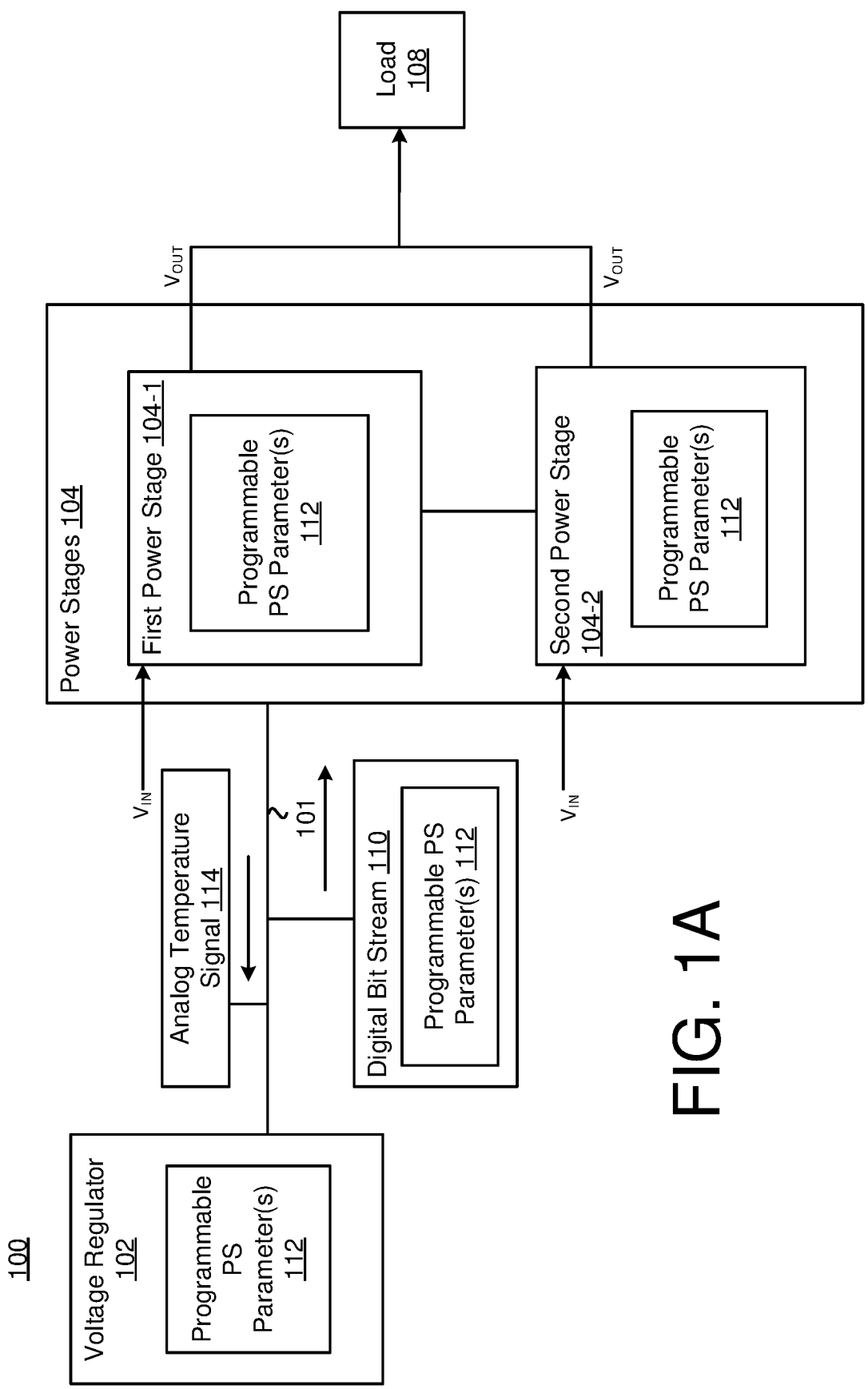
FIG. 1A illustrates a power supply system having a voltage regulator configured to transmit a digital bit stream to a plurality of power stages according to an aspect.

This description relates to a power supply system including a voltage regulator, and a plurality of power stages coupled to the voltage regulator. The voltage regulator may transmit (e.g., broadcast) a digital bit stream to the power stages over a communication line (e.g., a temperature communication line ($T_{MON}$)) that is used to provide an analog temperature signal from the power stages to the voltage regulator. The digital bit stream includes one or more programmable power stage parameters.

The communication line that is used to transmit the digital bit stream is also used to transmit analog temperature information about one or more components of the power stages back to the voltage regulator. For example, the voltage regulator may receive an analog temperature signal from the power stages in one direction, but then transmit, via the same communication line, the digital bit stream to the power stages in the reverse direction. In some examples, the power stage with the highest detected temperature sets the voltage on the communication line, where the level of voltage on the communication line is correlated with the detected temperature (e.g., higher the voltage, higher the temperature).

However, according to the embodiments discussed herein, the voltage regulator is configured to use the same communication line to also transmit a digital bit stream to the power stages to customize or update the power stages in a manner that does not affect the performance of overtemperature protection and analog temperature signals transmitted from the power stages to the voltage regulator. In some examples, the voltage regulator transmits the digital bit stream over a voltage range that is different from a voltage range used to detect the analog temperature signal. Even if the voltage regulator will interrupt the analog transmission of the temperature signal from the power stages to transmit a digital bit stream, the time interval to send the digital transmission will be relatively shorter (e.g., substantially shorter) than the time needed by the overall system to increase the temperature. This means that the digital transmission may occur at startup of the system or during the run-time of the system.

In this manner, the voltage regulator may update or change control parameters for the power stages to adapt the power supply system to a different application or update the control parameters for an existing application in a quick and easy manner without the need to modify (e.g., manually modify) those parameters at the individual power stages. Furthermore, in some conventional approaches, the application dependent parameters are typically stored at the individual power stages at production and are usually customized to a particular application, thereby making any subsequent modification relatively difficult.

However, according to the techniques discussed herein, the power stages may be programmable in the field, which may allow the power stages to be relatively more generic at production, thereby simplifying the supply chain. The configuration of the power stages to a particular application may be performed while the system is in the field. For example, the configuration of the power stages may be updated before (or during) a start-up operation or during runtime operations of the power stages. Furthermore, the signal techniques that enable dual usage of the communication line to detect analog temperature signals from the power stages and broadcast power stage parameters to the power stages may avoid (or minimize) the interference with the operations of the power stages while still providing good overtemperature protection. Also, the techniques discussed herein may overcome technical problems associated with driving a digital signal over a communication line that is used to report analog information. In addition, the techniques discussed herein may be compatible with existing pin layouts, thereby avoiding the need to change the pin layout.

FIGS. 1A though 1E illustrate various aspects of a power supply system 100 having a voltage regulator 102 and a plurality of power stages 104. The voltage regulator 102 is configured to transmit a digital bit stream 110 to the power stages 104 via a communication line 101 that is also used to detect an analog temperature signal 114. In some examples, the communication line 101 is referred to as a temperature communication line ($T_{MON}$). In some examples, the communication line 101 is a transmission line. In some examples, the communication line 101 is a conductive wire. In some examples, the communication line 101 is coupled to the voltage regulator 102 and a temperature pin 145 of an integrated circuit 136 of one or more power stages 104.

The digital bit stream 110 includes one or more programmable power stage parameters 112. The programmable power stage parameters 112 may define control or operational settings for the power stages 104. In some examples, the programmable power stage parameters 112 may be parameters and/or thresholds that are application specific or dependent upon a particular use of the power supply system 100. In some examples, the programmable power stage parameters 112 include parameters and/or thresholds that are used to set the thresholds for overtemperature protection, overcurrent protection, high-side short protection, and/or undervoltage lockout protection, etc. However, generally, the programmable power stage parameters 112 may be any type of parameter that can be programmable.

Figure 1B:
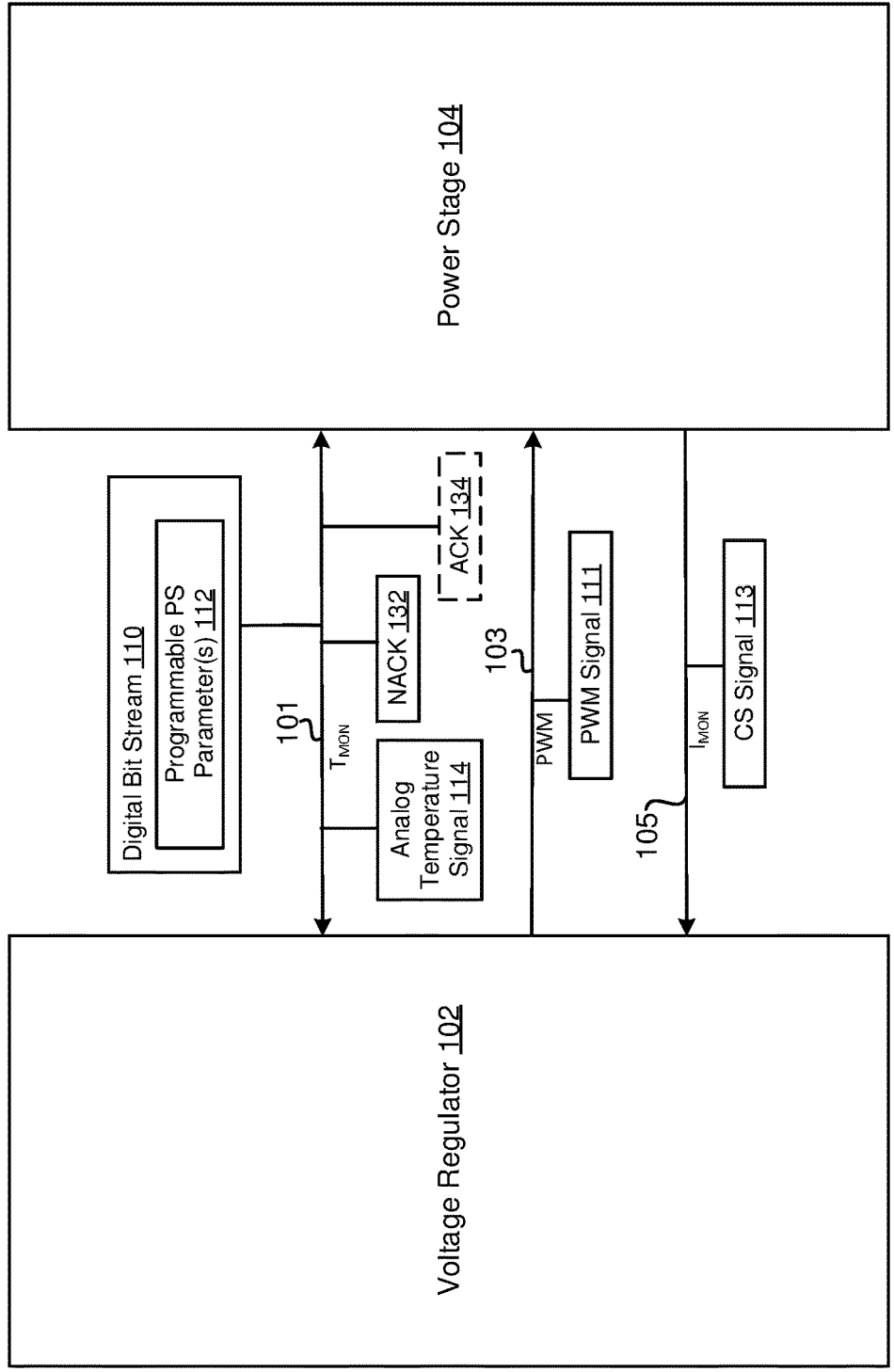
FIG. 1B illustrates example communication between a voltage regulator and a power stage according to an aspect.
Figure 1C:
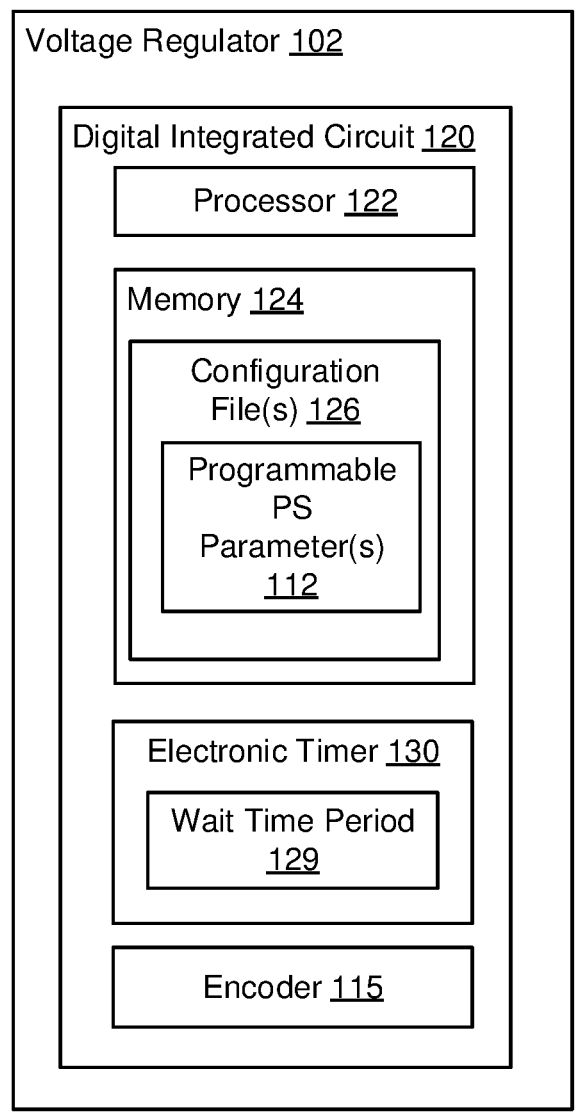
FIG. 1C illustrates an example of a voltage regulator according to an aspect.
Figure 1D:
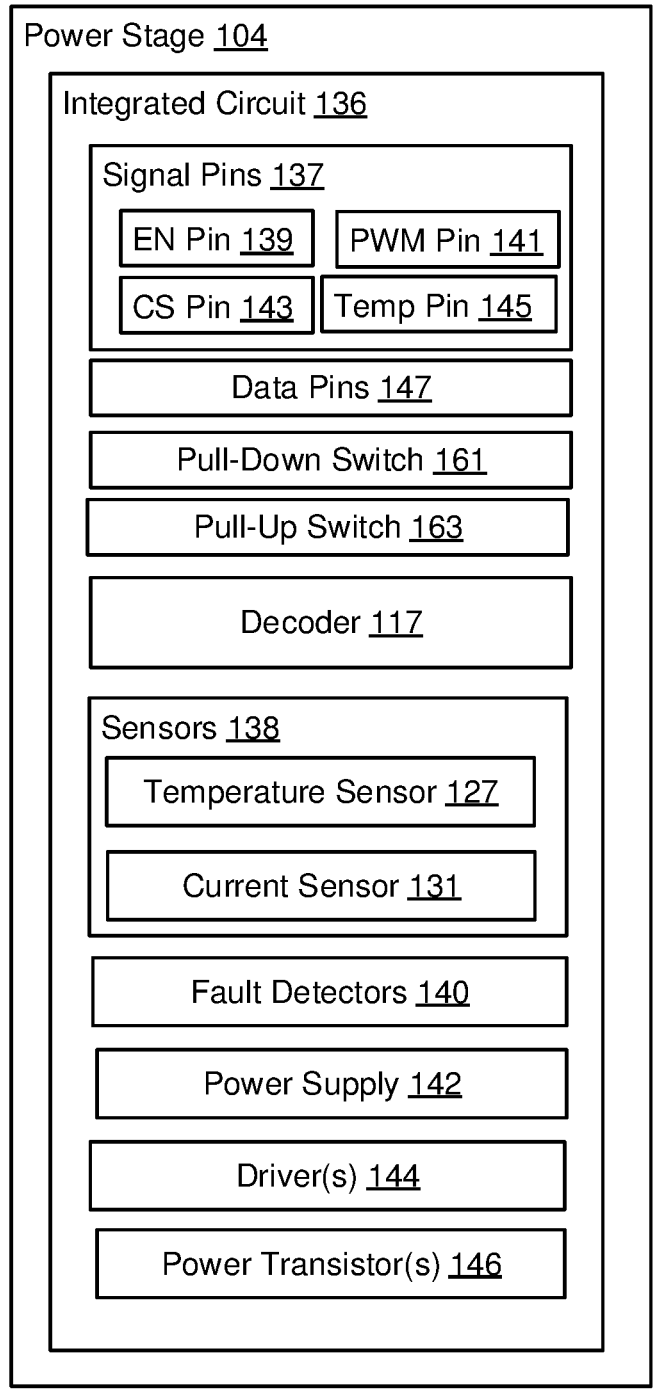
FIG. 1D illustrates an example of a power stage according to an aspect.
Figure 1E:
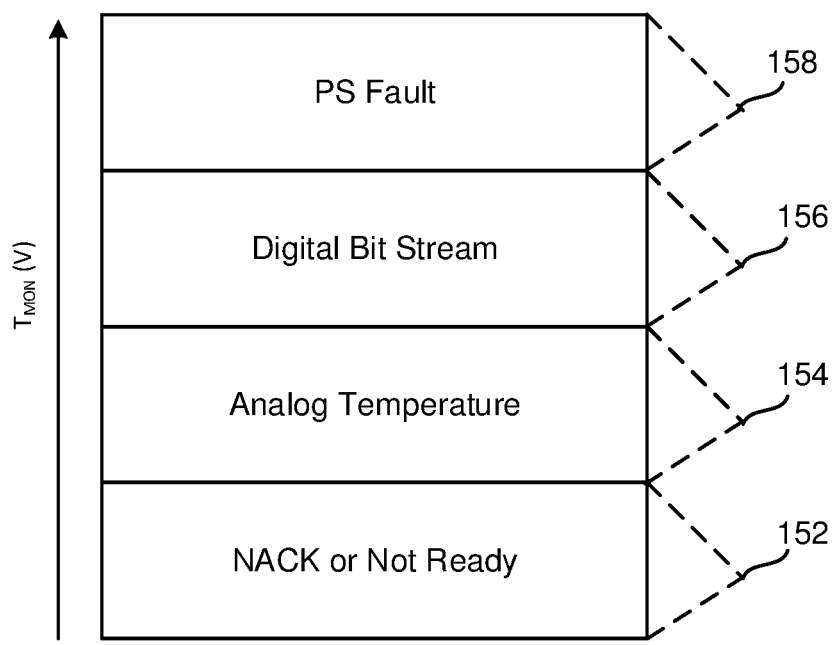
FIG. 1E illustrates a plurality of voltage ranges for a communication line between the voltage regulator and the power stages according to an aspect.

FIG. 1A depicts the voltage regulator 102 in communication with two power stages 104. FIG. 1B illustrates a more detailed example of the transmission between the voltage regulator 102 and an individual power stage 104 (which can be any of the power stages 104). FIG. 1C illustrates an example of the voltage regulator 102. FIG. 1D illustrates an example of an individual power stage 104 (which can be any of the power stages 104). FIG. 1E illustrates an example of a physical layer 150 of a transmission protocol for transmitting information over the communication line 101.

The power stages 104 are configured to be coupled to a load 108. In some examples, the power stages 104 are connected in parallel. In some examples, the power stages 104 are connected in series. In some examples, the power supply system 100 includes a combination of parallel and series power stages 104. The power stages 104 includes a first power stage 104-1 and a second power stage 104-2. Although two power stages 104 are depicted in FIG. 1A, it is understood that the number of power stages 104 may be greater than two such as three power stages 104, four power stages 104, or any number of power stages 104 greater than four. Each power stage 104 converts electrical power such as converting between alternating current (AC) and direct current (DC), DC to DC, DC to AC or changing the voltage or frequency for any combination thereof.

Generally, a power stage 104 may encompass one of a wide variety of topologies such as a buck converter, boost converter, inverting buck-boost converter, fly-back converter, active clamp forward converter, single switch forward converter, two switch forward converter, push-pull converter, half-bridge converter, full-bridge converter, phase-shifted full-bridge converter, etc.

In some examples, each power stage 104 is a smart power stage (SPS) or a SPS device, which may be used in user computing devices, servers, workstations, etc. A SPS device may be considered a multi-chip module (MCM) power stage. A SPS device may include one or more integrated metal-oxide-semiconductor field effect transistors (MOSFETs). In some examples, each power stage 104 includes relatively fast analog current and temperature sensors and a relatively limited pin assignment, as further shown in FIGS. 4A and 4B.

As shown in FIG. 1D, an individual power stage 104 may include an integrated circuit 136. The integrated circuit 136 includes signal pins 137, data pins 147, a pull-down switch 161 (also referred to as a first switch), a pull-up switch 163 (also referred to a second switch), sensors 138, fault detectors 140, one or more drivers 144, a power supply 142 (or multiple power supplies 142), and one or more power transistors 146. In addition, the integrated circuit 136 may include pulse width modulation (PWM) control logic, level shifts, and/or other circuit components such as diodes, resistors, capacitors, inductors, and/or transformers. The power transistors 146 may include switches such as transistors, field-effect transistors (FETs) or metal-oxide-semiconductor field effect transistors (MOSFETs)). In some examples, the power transistors 146 includes a high-side FET and a low-side FET. The drivers 144 may include a low-side driver and a high-side driver. The power supply 142 may be the power supply for the low-side driver and the high-side driver, or a power supply for the low-side driver and another power supply for the high-side driver.

The signal pins 137 may include an enable pin 139, a PWM pin 141, a current sense (CS) pin 143, and a temperature pin 145. In some examples, the temperature pin 145 is coupled to the communication line 101. In some examples, the pull-down switch 161 is coupled to the temperature pin 145 to pull down (or decrease) the voltage on the temperature pin 145 (and thereby the voltage on the communication line 101). In some examples, the pull-up switch 163 is coupled to the temperature pin 145 to pull up (or increase) the voltage on the temperature pin 145 (and thereby the voltage on the communication line 101).

The enable pin 139 may be an enable input pin for sequencing. In some examples, the enable pin 139 is connected to a divider at a drive voltage ($PV_{CC}$). The PWM pin 141 may be a driving signal with a number of different modes (e.g., high, medium, low), which may be dependent on the operation of the voltage regulator 102. In some examples, a communication line 103 (e.g., a PWM communication line) is coupled to the PWM pin 141 and the voltage regulator 102. For example, the voltage regulator 102 may transmit a PWM signal 111 to each power stage 104 via a separate communication line 103, which allows the voltage regulator 102 to independently control the PWM operations at the power stages 104. The CS pin 143 may output a CS signal 113 representing the current level of the power transistors 146. In some examples, the CS pin 143 may output a signal representing a MOSEFT's drain currents. In some examples, a communication line 105 (e.g., an $I_{MON}$ communication line) is coupled to the CS pin 143 and the voltage regulator 102. For example, the voltage regulator 102 may independently receive a CS signal 113 from each power stage 104 via a separate communication line 105.

In some examples, the temperature pin 145 may output an analog temperature signal 114 representing a temperature of the power transistors 146. In some examples, the communication line 101 is a single communication that extends to the voltage regulator 102, where the power stage 104 having the highest detected temperature sets the voltage on the temperature pin 145 (and thereby the voltage one the communication line 101). For example, unlike the PWM signals 111 and the CS signals 113 (which are reported by each power stage 104), the voltage regulator 102 may receive the analog temperature signal 114 (via the communication line 101) from the power stages 104 (collectively). For example, the temperature pins 145 of the various power stages 104 may be shorted together, where the power stage 104 having the highest monitored temperature is configured to set the voltage on the temperature pin 145 (and thereby the voltage on the communication line 101). In some examples, a separate communication line 101 extends between each power stage 104 (e.g., connected to a respective temperature pin 145) and the voltage regulator 102 to enable independent reporting of the temperature. For such examples, the communication line 101 (e.g., TMON wire) may be considered a good candidate to enable the voltage regulator 102 to communicate the digital bit stream 110 to a plurality of power stages 104.

In some examples, the analog temperature signal 114 is an analog voltage level that indicates the temperature of the power transistors 146. In some examples, the analog temperature signal 114 is a voltage sourced signal that is calibrated to provide a certain voltage output (e.g., 0.8V) at a certain temperature (e.g., 25 degree Celsius) with a V/T slope (e.g., 8 mv/° C. slope). In other words, the relationship between voltage and temperature is linear, where a higher voltage indicates a higher temperature.

In some examples, the temperature pin 145 may also operate a fault reporting pin. For example, if a power stage 104 detects a fault condition (e.g., overtemperature, overcurrent, overvoltage, etc), the power stage 104 may increase the voltage (e.g., pull-up the voltage) on the temperature pin 145 to be above a threshold amount (e.g., pull-up the voltage to be greater than three Volts). For example, the integrated circuit 136 may activate the pull-up switch 163 to increase the voltage on the temperature pin 145 (and thereby the voltage on the communication line 101) to be greater than a threshold level. Then, in response to the voltage regulator 102 detecting that the voltage on the communication line 101 is greater than the threshold level, the voltage regulator 102 may detect that one of the power stages 104 has detected as a fault condition.

In some examples, during (or before) a start-up operation at the power stages 104, the voltage on the temperature pin 145 may provide a status message to the voltage regulator 102 to indicate that one or more of the power stages 104 is not ready (e.g., not ready to receive the digital bit stream 110). In some examples, the integrated circuit 136 may activate the pull-down switch 161 to decrease the voltage on the temperature pin 145 (and thereby the voltage on the communication line 101) to be less than a threshold amount (e.g., pull-down the voltage to be less than 0.2V), which indicates that the power stage 104 is not ready.

Further, in some examples, during the operation of the power stages 104, the voltage on the temperature pin 145 may be used to send a negative acknowledgement message 132 (or an acknowledgement message 134) to the voltage regulator 102 to indicate that the digital bit stream 110 was not correctly received (or correctly received). For example, the power stage 104 may ACK or NACK the digital bit stream 110 by activating the pull-down switch 161 to decrease the voltage on the temperature pin 145 (and thereby the voltage on the communication line 101) to be less than the threshold amount for a period of time. In some examples, the amount of time that the voltage is pulled down (e.g., NACKed) may provide identification about the power stages 104 to the voltage regulator 102.

The sensors 138 may include a temperature sensor 127 and a current sensor 131. The temperature sensor 127 may be an integrated temperature monitor that monitors and detects the temperature of the integrated circuit 136. If the temperature of the integrated circuit 136 of the first power stage 104-1 is the highest among the power stages 104, the first power stage 104-1 may set the voltage on the temperature pin 145 (and thereby the voltage on the communication line 101). The current sensor 131 may detect the current level of one or more power transistors and set the CS signal 113 for the CS pin 143, which is transmitted to the voltage regulator via the communication line 105.

The fault detectors 140 may include one or more circuits that provide a plurality of circuit protections such as thermal flag or overtemperature protection, overcurrent protection, high-side short protection, and/or undervoltage lockout protection, etc. For example, the power stage 104 may monitor the current delivered, the temperature of the power transistors 146, the power input bus, and the power supply 142 for the drivers 144, and the fault detectors 140 may incorporate a plurality of protections such as under voltages for the power supply 142, short circuit conditions on the drivers 144, overcurrent, and/or overtemperature, etc.

In some examples, when the current monitored by the current sensor 131 is above a threshold current level, a driver 144 (e.g., a high-side off driver) will provide less current to slow down the FET turning on or off and so consequently to reduce the high-side drain-source voltage (e.g., HS Vds) voltage spike. However, the value of the threshold current level may be application dependent. In some conventional approaches, the value of this threshold is set in the driver 144 by the fault detectors 140, which can make the supply chain more complicated and expensive (e.g., by creating different types of power stage devices with different part numbers for different applications). The threshold current level may be an example of a programmable power stage parameter 112.

The threshold current level may have a first value for a first application, and a second value for a second application. These values for the threshold current level may be stored as programmable power stage parameters 112 at the voltage regulator 102.

In addition, in some examples, the switching frequency may be increased to obtain higher density, and a turn-on time (ton) of a power transistor 146 (e.g., the high side FET) may become too short to enable the current sensor 131 to detect the flowing current. However, regulations may indicate the current information must not have discontinuity and be relatively accurate. To overcome this potential problem, a driver 144 may have to mimic the high side current, and to achieve this goal, the driver 144 may be required to obtain the application inductance value and the nominal output voltage. The application inductance value and the nominal output voltage may have different values for different applications. These values for the application inductance value and the nominal output voltage may be stored as programmable power stage parameters 112 at the voltage regulator 102.

In some examples, the programmable power stage parameters 112 may include fault identification information. The fault identification information may include a plurality of voltage set points to be used on the communication line 105 (e.g., the $I_{MON}$ wire), where each voltage set point corresponds to a different fault condition. For example, when a fault condition occurs in a power stage 104, the power stage 104 may drive the communication line 101 (e.g., the $T_{MON}$ wire) high. However, in some examples, the voltage regulator 102 may not be able to determine the cause of the fault and which power stage 104 reported the fault condition. To understand the cause of the fault condition, the voltage regulator 102 may need an individual wire for each power stage 104. In some examples, the communication line 103 (e.g., the PWM wire) may not be a good candidate because signals are sent over the communication line 103 to control the power stages 104 in the event of a fault condition. However, in some examples, the communication line 105 (e.g., the $I_{MON}$ wire) may be a good candidate to report the type of fault condition and which power stage 104 has detected the fault condition. In some examples, the voltage regulator 102 may store a different voltage setpoint (e.g., $I_{MON}$ voltage setpoint) for each type of fault condition. In some examples, the digital bit stream 110 may be used to determine the voltage setpoints for each type of fault condition in the power stage 104. In some examples, if the power stages 104 define voltage setpoints but these voltage setpoints are not compatible (or desirable) with a particular voltage regulator 102, the voltage regulator 102 may transmit the voltage setpoints in the digital bit stream 110 to the power stages 104.

The voltage regulator 102 may be a multi-phase controller configured to control the power stages 104. In some examples, the voltage regulator 102 may include a combination of digital and analog components. In some examples, the voltage regulator 102 may include logic circuits, comparators, memory devices, etc. In some examples, as shown in FIG. 1C, the voltage regulator 102 includes a digital integrated circuit 120 having a processor 122 and a memory 124. The memory 124 may include one or more configuration files 126 for one or more than one application. The configuration files 126 may store the programmable power stage parameters 112. The programmable power stage parameters 112 may include control parameters to be implemented at the power stages 104. For example, the programmable power stage parameters 112 may include one or more threshold values for the current sensor 131 that is used by fault detectors 140 for a number of different types of applications. The programmable power stage parameters 112 may include application indication and nominal output voltage for a number of different types of applications.

The voltage regulator 102 may broadcast the programmable power stage parameters 128 to the power stages 104 by transmitting a digital bit stream 110 to the power stages 104 via the communication line 101. For example, the voltage regulator 102 is connected to each of the power stages 104 via a plurality of communication lines including the communication line 101, the communication line 103, and the communication line 105.

The voltage regulator 102 may independently transmit a PWM signal 111 to each power stage 104 via the communication line 103. The PWM signal 111 may indicate one or more PWM control parameters such as duty cycle and/or frequency. In some examples, the PWM signal 111 is a digital signal. For example, the voltage regulator 102 may interrupt the PWM operations and/or adjust the PWM operations of the power stage 104 by transmitting a PWM signal 111 to a particular power stage 104 or all the power stages 104.

The voltage regulator 102 may independently receive a current sense signal 113 from each power stage 104 via a separate communication line 105. In some examples, the current sense signal 113 is an analog signal. For example, the voltage regulator 102 may monitor the current of the power transistors 146 by monitoring the voltage level on the communication line 105.

The voltage regulator 102 may receive the analog temperature signal 114 from the power stages 104 via the communication line 101. As indicated above, the analog temperature signal 114 may represent a temperature of the power transistors 146 (e.g., the temperature of the power transistors 146 from the power stage 104 having the highest temperature). In some examples, the analog temperature signal 114 is an analog signal. For example, the voltage regulator 102 may detect the analog temperature signal 114 by detecting the voltage (e.g., the voltage level) on the communication line 101. In some examples, the voltage regulator 102 may detect the analog temperature signal 114 when the voltage level on the communication line 101 is within a certain range (e.g., 0.8 to 1.8V). Also, as indicated above, using the same communication line 101, the voltage regulator 102 may receive information indicating a fault condition. For example, the integrated circuit 136 on the power stage 104 may increase the voltage on the communication line 101 to be greater than a threshold amount, which indicates to the voltage regulator 102 that the power stage 104 has detected a fault condition.

Further, according to the techniques discussed herein, the voltage regulator 102 may transmit a digital bit stream 110 to all power stages 104 using the communication line 101 that is the same one that is used to detect the analog temperature signal 114, where the digital bit stream 110 includes one or more programmable power stage parameters 112. For example, the digital integrated circuit 120 of the voltage regulator 102 may send (e.g., send one time) the digital bit stream 110 to each of the power stages 104 using the communication line 101. For example, the memory 124 stores the programmable power stage parameters 112, as well as the data required by the applications of the voltage regulator 102.

FIG. 1E illustrates an example of a physical layer 150 of a transmission protocol for transmitting information over the communication line 101. The physical layer 150 may assign an information type to a voltage range on the communication line 101 so that the voltage regulator 102 and the power stages 104 can use the communication line 101 to exchange different types of information. In other words, each category of information capable of being relayed over the communication line 101 is assigned to a separate voltage space.

In some examples, a first voltage range 152 indicates a negative acknowledgement message 132 (or alternatively an acknowledgement message 134) or a message that indicates that a power stage 104 is not ready. The first voltage range 152 may indicate an upper limit and a lower limit. The power stage 104 may signal a negative acknowledgement message 132 or a message that indicates that the power stage 104 is not ready by setting the voltage on the communication line 101 to be a value within the first voltage range 152. In some examples, the integrated circuit 136 of the power stage 104 activates the pull-down switch 161 to decrease the voltage on the communication line 101 to be within the first voltage range 152 and/or below the upper limit of the first voltage range 152. In some examples, the voltage on the communication line 101 is pulled down to ground. In some examples, the first voltage range 152 is a range between, for example, 0.0 to 0.4V. The integrated circuit 136 of the power stage 104 may activate the pull-down switch 161 to signal the negative acknowledgement message 132 (or the not ready message), where the pull-down switch 161 decreases the voltage on the communication line 101 to be less than 0.4V.

In some examples, a second voltage range 154 indicates a voltage range that is used to indicate the analog temperature, e.g., to signal the analog temperature signal 114. For example, signals received by the voltage regulator 102 with the voltage on the communication line 101 within the second voltage range 154 indicate analog temperature signals 114. In some examples, when the pull-down switch 161 is deactivated (and a pull-up switch 163 is deactivated), the voltage on the communication line 101 is within the second voltage range 154, which provides the analog temperature signals 114 to the voltage regulator 102. If the voltage is close to the lower limit of the second voltage range 154, the temperature is close to the minimum temperature. If the voltage is close to the upper limit of the second voltage range 154, the temperature is close to the maximum temperature. In some examples, the second voltage range 154 is between 0.8 volts and 1.8 volts. In some examples, when the temperature is 25° C., the integrated circuit 136 sets the voltage at the lower limit, e.g., 0.8V. In some examples, for a one degree temperature increase, the voltage increases by 8 mv. In some examples, if the maximum temperature is 150° C., the maximum voltage is 0.8V+125° C.×8 mV=1.8V.

In some examples, a third voltage range 156 indicates a voltage range that is used to digitally transmit the digital bit stream 110. For example, the voltage regulator 102 uses the digital levels between the upper limit and lower limit of the third voltage range 156. In some examples, the third voltage range 156 is between 2.0V and 3.0V. In some examples, a logic low value can be less than 2.2V, and a logic high value can be greater than 2.8V.

In some examples, a fourth voltage range 158 indicates a voltage range that is used to specify a power stage fault. For example, if the power stage 104 detects a fault condition, the power stage 104 may send a fault signal on the communication line 101 by adjusting the voltage on the communication line 101 to be within the fourth voltage range 158. In some examples, the fourth voltage range 158 is any value greater than a threshold amount (e.g., 3V). In some examples, the integrated circuit 136 of the power stage 104 activates the pull-up switch 163 to increase the voltage on the communication line 101 to be greater than a threshold level (e.g., the lower limit of the fourth voltage range 158).

In some examples, the digital bit stream 110 is transmitted before (or during) the startup operations of the power stages 104. The voltage regulator 102 may control the timing of the startup operations of the power stages 104, and the voltage regulator 102 may transmit the digital bit stream 110 and initiate a power stage start-up operation after the digital bit stream 110 is transmitted. As indicated above, the voltage regulator 102 may transmit the digital bit stream 110 with digital logic levels in the third voltage range 156.

In some examples, the integrated circuit 136 of the power stage 104 may adjust the voltage on the communication line 101 to be within the first voltage range 152 (e.g., pulled low to ground) by activating the pull-down switch 161, where the voltage on the communication line 101 being within the first voltage range 152 indicates that the power stage 104 is not ready. The voltage regulator 102 may detect that the power stage 104 is not ready (by detecting the voltage on the communication line 101 to be within the first voltage range 152) and then delay the transmission of the digital bit stream 110 until the power stage 104 releases the communication line 101. The power stage 104 releases the communication line 101 by deactivating the pull-down switch 161. In some examples, the power stage 104 detects that it is not ready in response to the voltage of the power supply 142 being less than a threshold condition (e.g., less than 5V ULVO). The voltage regulator 102 may determine that the power stage 104 has released the communication line 101 when the voltage on the communication line 101 is within the second voltage range 154 (e.g., within 0.8V to 1.8V). In response to the voltage regulator 102 detecting that the voltage on the communication line 101 is within the second voltage range 154, the voltage regulator 102 may transmit the digital bit stream 110 with digital levels within the third voltage range 156.

In some examples, before (or during) startup of the power stages 104, the voltage regulator 102 may transmit the digital bit stream 110 according to a first data rate. In some examples, the first data rate is about 1 bit/10 μs. In other words, since the owner of the system start-up is the voltage regulator 102, the master is unique and is the voltage regulator 102. In some examples, the startup operations initiated by the voltage regulator 102 may have a duration that lasts for several tens of microseconds. In some examples, if the power supply system 100 dedicates one millisecond to send a data stream of 100 bits, the first data rate may have a target rate 1 bit/10 μs.

In some examples, the voltage regulator 102 is configured to transmit the digital bit stream 110 while the power stages 104 are operating. For example, during operation of the power supply system 100, the voltage regulator 102 may interrupt the detection of the analog temperature signal 114, transmit the digital bit stream 110, and then resume the detection of the analog temperature signal 114 after the digital bit stream 110 is transmitted. For example, the voltage regulator 102 may transmit the digital bit stream 110 with digital levels within the third voltage range 156 (e.g., during a period of time such as one millisecond).

During operation, the voltage regulator 102 may transmit the digital bit stream 110 to each of the power stages 104 according to a second data rate. In some examples, the second data rate is faster than the first data rate. In one millisecond, the temperature of the power stages 104 may not significantly change, and the voltage regulator 102 can interrupt the temperature reading by initiating the digital transmission of the digital bit stream 110. After transmitting the digital bit stream 110, the digital integrated circuit 120 may release the communication line 101 to the second voltage range 154 in order to detect the analog temperature signals 114.

In some examples, if a particular power stage 104 receives an error associated with the digital bit stream 110, the integrated circuit 136 of the power stage 104 may can send a negative acknowledgement message 132 on the communication line 101 by activating the pull-down switch 161, which decreases the voltage on the communication line 101 to be within the first voltage range 152 (e.g., less than the upper limit of the first voltage range 152). For example, the integrated circuit 136 of the power stage 104 may determine that an error has occurred if the digital bit stream 110 has not been correctly received or the data is not in a format recognizable by the power stage 104. If the integrated circuit 136 of the power stage 104 determines that there is an error associated with the digital bit stream 110, the power stage 104 may generate the negative acknowledgement message 132 on the communication line 101 by activating the pull-down switch 161. In response to receipt of the negative acknowledgement message 132, the voltage regulator 102 may re-transmit the digital bit stream 110 to the power stages 104.

The voltage regulator 102 may include an electronic timer 130. In some examples, the electronic timer 130 is a watchdog timer that is used to set (or reset) a wait time period 129. The wait time period 129 may be a fixed period of time defining a time duration. In some examples, the voltage regulator 102 is configured to reset the wait time period 129 in response to transmission of the digital bit stream 110 to the power stages 104. During the wait time period 129, the voltage regulator 102 is configured to detect analog temperature signals 114 and detect any negative acknowledgement messages 132 on the communication line 101 from the power stages 104. If the voltage regulator 102 receives a negative acknowledgement message 132 from a power stage 104 during the wait time period 129, the voltage regulator 102 may re-transmit the digital bit stream 110. If the voltage regulator 102 does not receive a negative acknowledgement message 132 from the power stages 104 during the wait time period 129, the voltage regulator 102 may determine that the digital bit stream 110 has been successfully received by the power stages 104, The digital bit stream 110 may be a digital signal that encodes the programmable power stage parameters 112. For example, the digital integrated circuit 120 of the voltage regulator 102 may include an encoder 115 that encodes the programmable power stage parameters 112 into the digital bit stream 110. The power supply system 100 may encompass any type of encoding scheme used to encode information in a digital signal. In some examples, the encoding scheme is a Manchester encoding scheme. The Manchester encoding scheme may be relatively robust when the information wire is relatively long and there is uncertainty about the digital delay and narrowed digital voltage levels. The integrated circuit 136 of each power stage 104 includes a decoder 117 configured to decode the digital bit stream 110 to obtain the programmable power stage parameters 112.

As explained above, the digital bit stream 110 is transmitted with digital logic levels in the third voltage range 156. As an example, the third voltage range 156 may be 2.0V to 3.0V. The third voltage range 156 may specify a voltage value (within the third voltage range 156) that operates as a logic high threshold (e.g., 2.8V), where voltage values above the logic high threshold indicate a logic high. The third voltage range 156 may specify a voltage value (within the third voltage range 156) that operates as a logic low threshold (e.g., 2.2V), where voltage values below the logic low threshold indicate a logic low.

Figure 2:
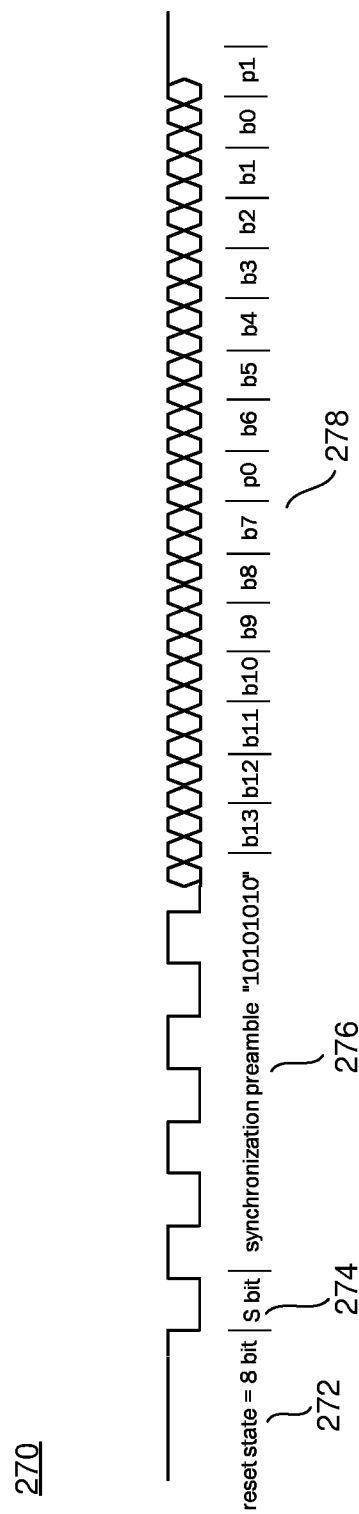
FIG. 2 illustrates an encoding scheme for encoding power stage parameters into a digital bit stream according to an aspect.

FIG. 2 illustrates an encoding scheme 270 used by the encoder 115 to encode the programmable power stage parameters 112. In some examples, the encoding scheme 270 is a Manchester encoding scheme. The coding states may define a logic low state represented by a high-low signal sequence (e.g., a falling edge) and a logic high state is represented by a low-high signal sequence (e.g., rising edge). In some examples, the logic low stage is represented by the transition from the logic low threshold (e.g., 2.2V) to the logic high threshold (e.g., 2.8V) within the third voltage range 156. In some examples, the logic high state is represented by the transition from the logic high threshold (e.g., 2.8V) to the logic low threshold (e.g., 2.2V) within the third voltage range 156.

Each bit is transmitted in a fixed time, and the transitions occur at the midpoint of a period. The encoder 115 may use an exclusive OR logic component to obtain the line symbol. In some examples, the decoder 117 has a sampling frequency that is greater (e.g., four times higher) than the baud rate of the transmitted signal. In some examples, the encoder 115 has a sampling frequency of 100 KHz, and the decoder 117 has a sampling frequency of 400 KHz.

As shown in FIG. 2, the encoding scheme 270 depicts a frame of information that includes a reset state 272, a parity bit 274, a synchronization preamble 276, and data bits 278. The programmable power stage parameters 112 may be encoded into the data bits 278. The synchronization preamble 276 may be used by the decoder 117 for synchronization and to detect the correct start of the data packet. The frame may start with a start bit "0" to ensure a first commutation to the line, then follows the synchronization preamble 276.

Figure 3:
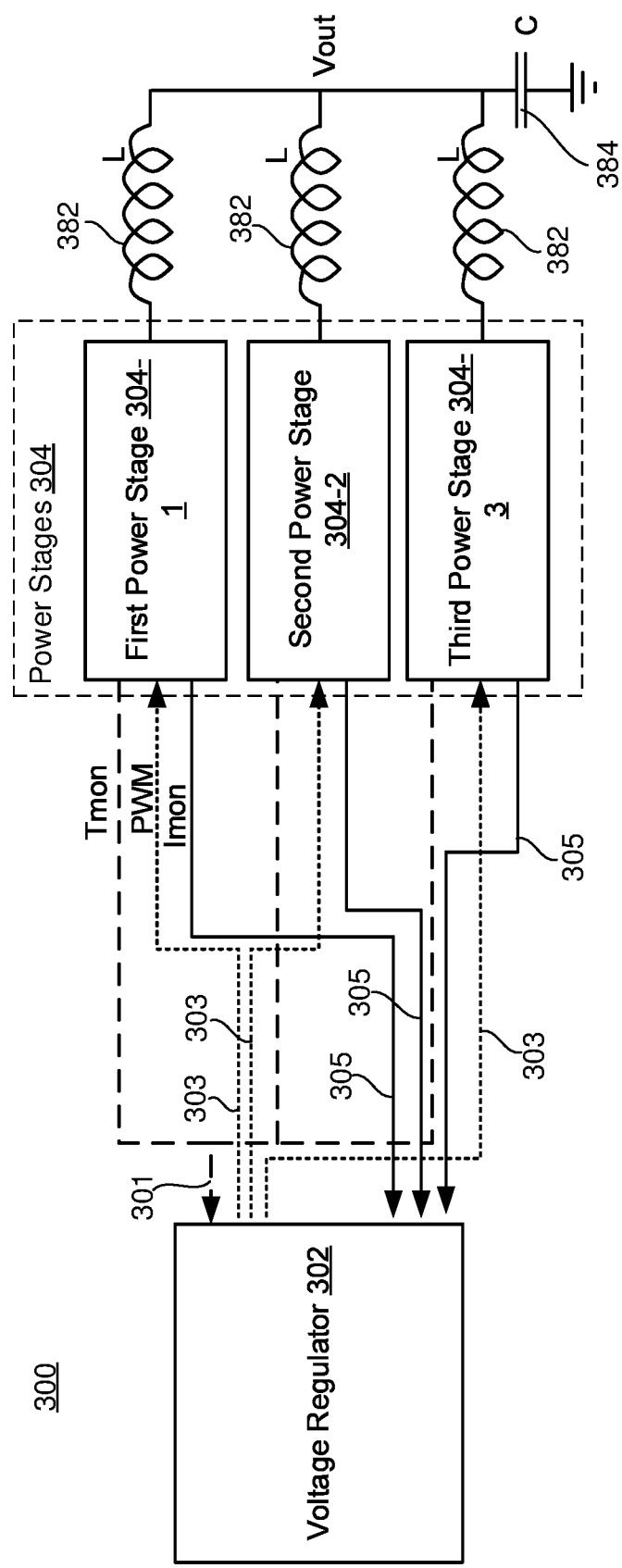
FIG. 3 illustrates a power supply system according to another aspect.

FIG. 3 illustrates an example of a power supply system 300 according to another aspect. For example, the power supply system 300 includes a voltage regulator 302 and a plurality of power stages 304 including a first power stage 304-1, a second power stage 304-2, and a third power stage 304-3. The power supply system 300 of FIG. 3 may include any of the details of the power supply system 100 of FIGS. 1A through 1E. The power supply system 300 is similar to the power supply system 100 of FIGS. 1 through 1E except that the number of power stages 304 is three. Also, the power supply system 300 includes an inductor 382 connected to an output of each power stage 304 and to a capacitor 384. The voltage regulator 302 is connected to each power stage 304 via a separate communication line 303 (e.g., a PWM communication line, the communication line 103 of FIGS. 1A through 1E) and a separate communication line 305 (e.g., a CS communication line, the communication line 305 of FIGS. 1A through 1E). Also, as shown in FIG. 3, the power stages 304 are connected to the voltage regulator 302 via a communication line 301 (e.g., a temperature ($T_{MON}$) communication line, the communication line 101 of FIGS. 1A through 1E).

Figure 4A:
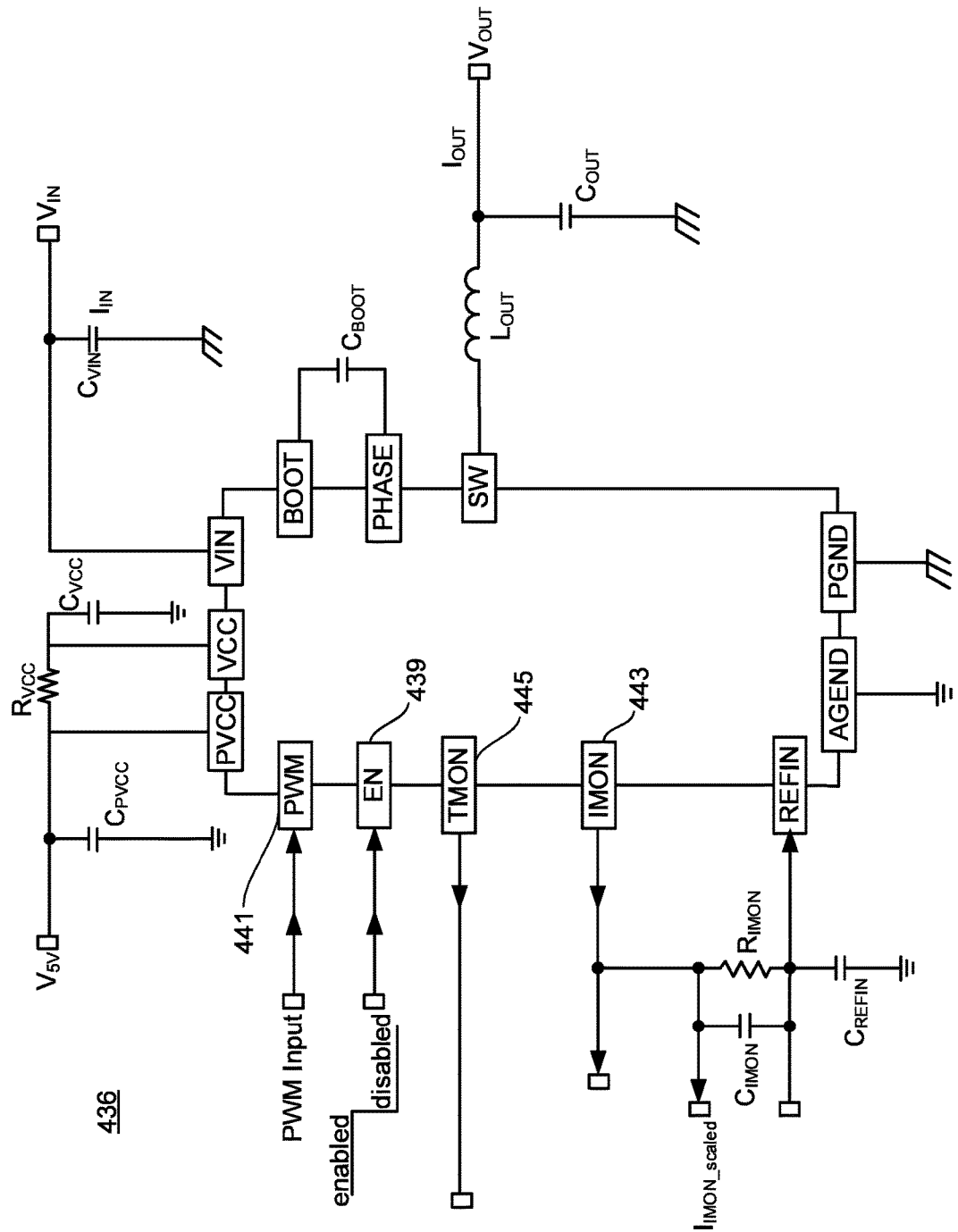
FIGS. 4A and 4B depict an example of a pin layout of an integrated circuit of a power stage according to an aspect.
Figure 4B:
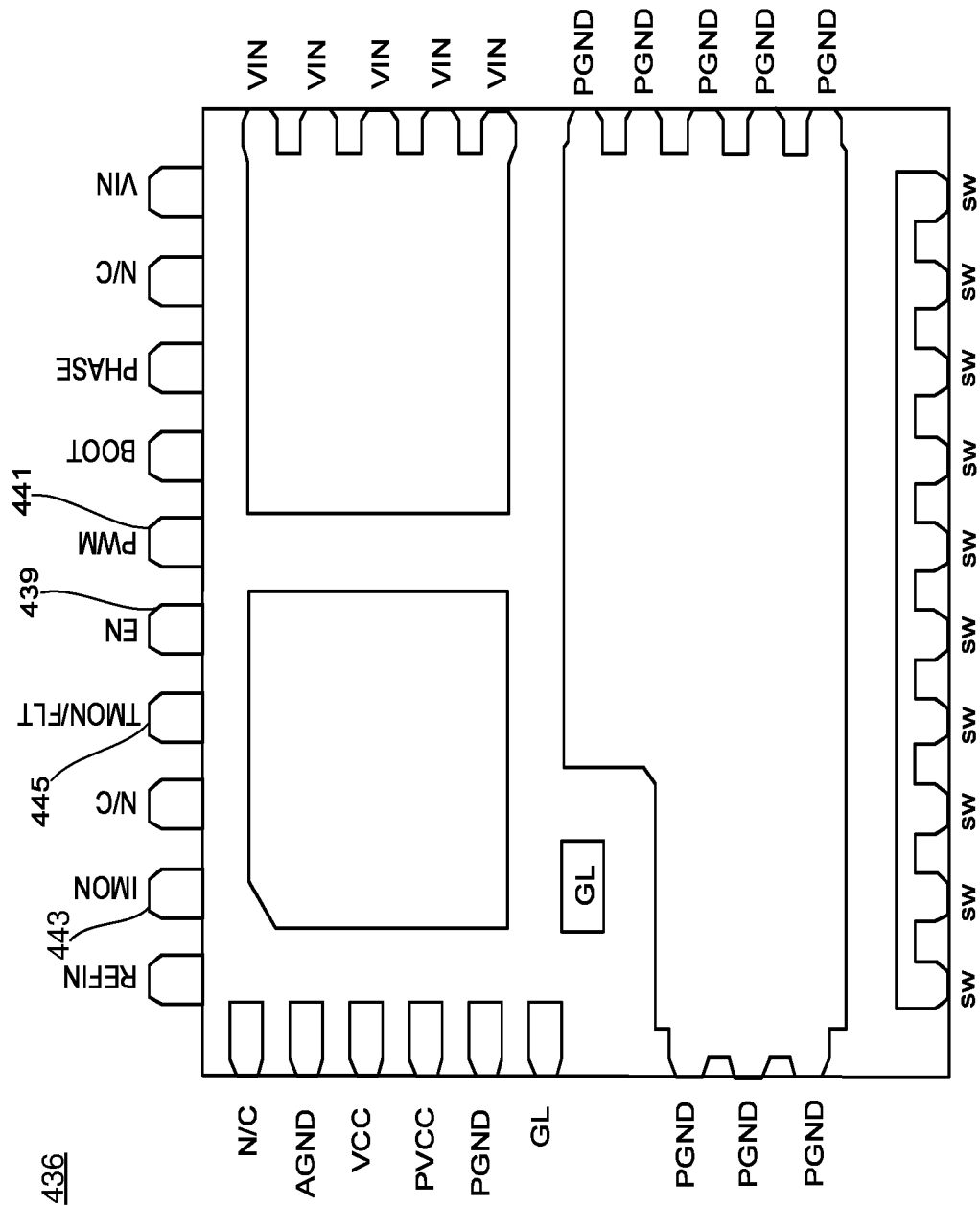

FIGS. 4A and 4B illustrate an example pin layout of an integrated circuit 436 for a power stage. The integrated circuit 436 may be an example of the integrated circuit 136 of FIG. 1D and include any of the details discussed herein. As shown in FIGS. 4A and 4B, the integrated circuit 436 includes an enable pin 439, a PWM pin 441, a temperature pin 445, and a CS pin 443. The enable pin 439, the PWM pin 441, the temperature pin 445, and the CS pin 443 may be the signal pins for the integrated circuit 336.

Figure 5:
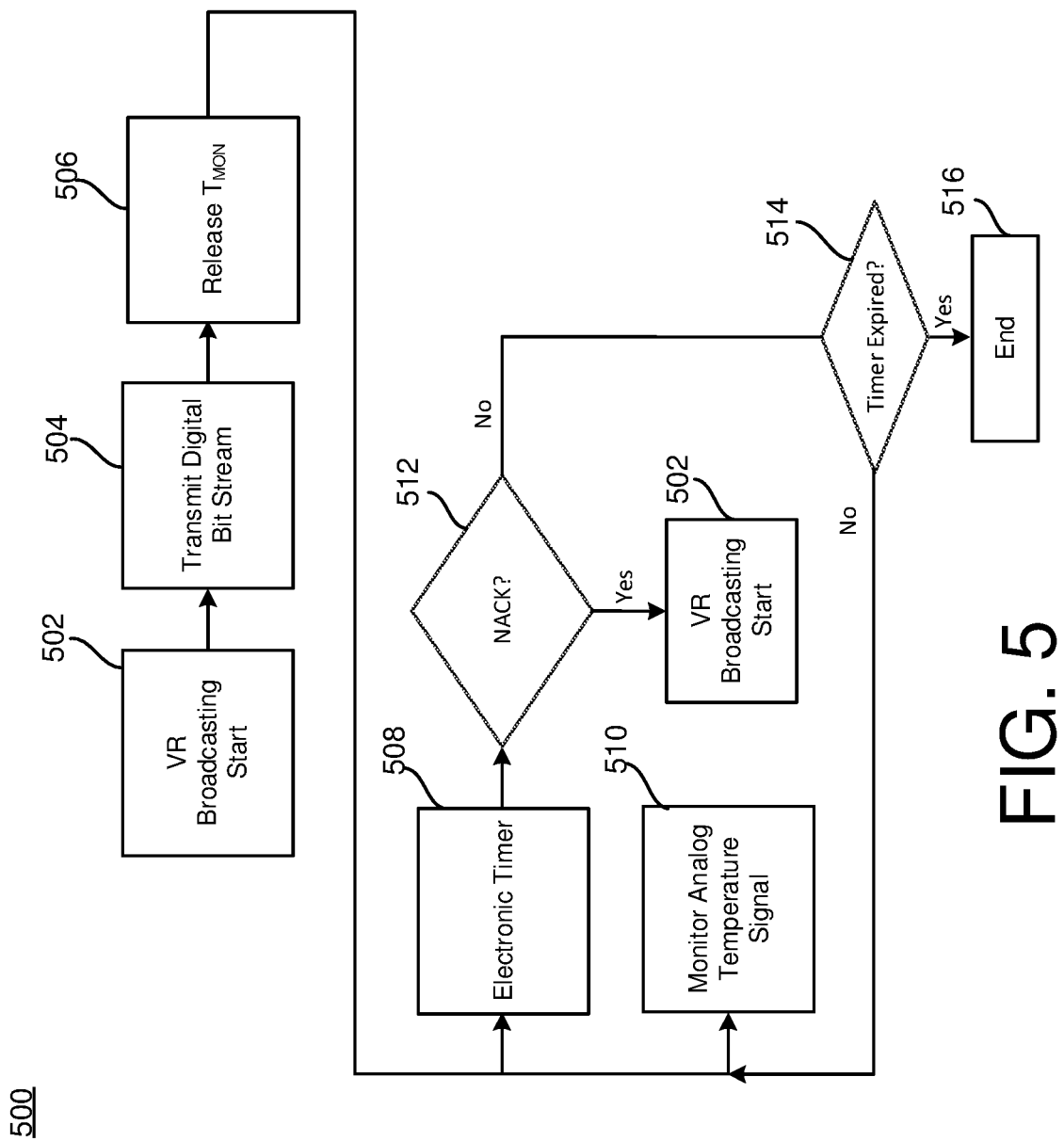
FIG. 5 illustrates a flowchart depicting example operations of a power supply system according to an aspect.

FIG. 5 illustrates a flowchart 500 depicting example operations of a power supply system. Although the flowchart 500 is explained with reference to the power supply system 100 of FIGS. 1A through 1E, the operations of FIG. 5 may be applicable to any of the power system systems described herein.

In operation 502, the voltage regulator 102 starts VR broadcasting, and in operation 504, the voltage regulator 102 transmits a digital bit stream 110 to a plurality of power stages 104. For example, the voltage regulator 102 transmits the digital bit stream 110 to each power stage 104 via the communication line 101. The voltage regulator 102 transmits the digital bit stream 110 with digital levels within a third voltage range 156 of the communication line 101. In operation 506, the voltage regulator 102 releases the communication line 101, where the communication line 101 returns to a voltage level within a second voltage range 154 so that the power stages 104 can report their analog temperature signals 114. In operation 508, the voltage regulator 102 sets an electronic timer 130 to start the beginning of a wait time period 129. The voltage regulator 102 sets the electronic timer 130 in response to the transmission of the digital bit stream 110 and/or the release of the communication line 101.

During the wait time period 129, in operation 510, the voltage regulator 102 monitors and receives the analog temperature signals 114 on the communication line 101. Also, during the wait time period 129, in operation 512, the voltage regulator 102 monitors the receipt of any negative acknowledgement messages 132 from the power stages 104. For example, if there is an error with the receipt/decoding of the digital bit stream 110 by a particular power stage 104, the power stage 104 may transmit a negative acknowledgement message 132 on the communication line 101 by activating the pull-down switch 161 that pulls down the voltage on the communication line 101 to be less than a threshold amount (e.g., below an upper limit of the first voltage range 152).

The voltage regulator 102 may detect a negative acknowledgement message 132 by detecting the voltage on the communication line 101 to be below the threshold amount. If a negative acknowledgement message 132 is detected, the operations return to operation 502, e.g., VR broadcasting start. If a negative acknowledgement message 132 is not detected, in operation 514, the voltage regulator 102 determines whether the wait time period 129 set by the electronic timer 130 has expired. If yes (e.g., the wait time period 129 has expired), in operation 516, the operation ends, e.g., VR broadcasting was successful. If no (e.g., the wait time period 129 has not expired), the voltage regulator 102 continues to detect the analog temperature signals 114 and whether any negative acknowledgement messages 132 have been detected on the communication line 101.

Figure 6:
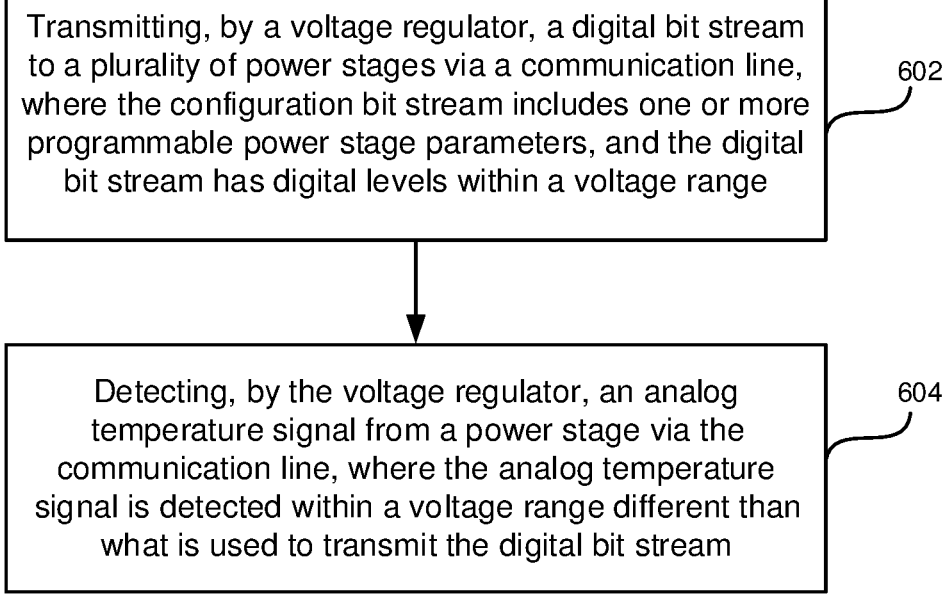
FIG. 6 illustrates a flowchart depicting example operations of a power supply system according to an aspect.

FIG. 6 illustrates a flowchart 600 depicting example operations of a power supply system. Although the flowchart 600 is explained with reference to the power supply system 100 of FIGS. 1A through 1E, the operations of FIG. 6 may be applicable to any of the power system systems described herein.

Operation 602 includes transmitting, by a voltage regulator 102, a digital bit stream 110 to a plurality of power stages 104 via a communication line 101, where the digital bit stream 110 includes one or more programmable power stage parameters 112, and the digital bit stream has digital levels within a voltage range (e.g., the third voltage range 156). Operation 604 includes detecting, by the voltage regulator 102, an analog temperature signal 114 from a power stage 104 via the communication line 101, where the analog temperature signal is detected within a voltage range (e.g., the second voltage range 154) different from what is used to transmit the digital bit stream 110.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A power supply system comprising:
a plurality of power stages including a first power stage and a second power stage; and
a voltage regulator connected to the first power stage and the second power stage, the voltage regulator configured to detect an analog temperature signal from at least one of the first power stage and the second power stage via a communication line, the analog temperature signal being detected within a first voltage range,
the voltage regulator configured to transmit a digital bit stream to the first power stage and the second power stage via the communication line, the digital bit stream including one or more programmable power stage parameters, the digital bit stream having digital levels within a second voltage range, the second voltage range being different from the first voltage range.

2. The power supply system of claim 1, wherein the first power stage includes a temperature pin coupled to the communication line.

3. The power supply system of claim 2, wherein the first power stage includes a first switch coupled to the temperature pin, wherein the first power stage is configured to transmit a negative acknowledgement message to the voltage regulator by activating the first switch to cause a voltage on the communication line to be within a third voltage range, the third voltage range being less than the first voltage range.

4. The power supply system of claim 3, wherein the first power stage includes a second switch coupled to the temperature pin, wherein the first power stage is configured to transmit a fault condition message to the voltage regulator by activating the second switch to cause a voltage on the communication line to be within a fourth voltage range, the fourth voltage range being higher than the second voltage range.

5. The power supply system of claim 1, wherein the analog temperature signal corresponds to a temperature of the first power stage in response to the temperature of the first power stage being higher than a temperature of the second power stage.

6. The power supply system of claim 1, wherein the voltage regulator includes a digital integrated circuit having a processor and a memory, the memory configured to store one or more configuration files having programmable power stage parameters.

7. The power supply system of claim 6, wherein the voltage regulator includes an electronic timer, the electronic timer configured to set a wait time period in response to the digital bit stream being transmitted, the digital integrated circuit configured to re-transmit the digital bit stream in response to receipt of a negative acknowledgment message on the communication line during the wait time period, the digital integrated circuit configured to monitor the analog temperature signal on the communication line during the wait time period.

8. The power supply system of claim 1, wherein the voltage regulator is configured to interrupt detection of the analog temperature signal on the communication line, transmit the digital bit stream to the plurality of power stages via the communication line, and resume the detection of the analog temperature signal.

9. A power supply system comprising:
a plurality of power stages; and
a voltage regulator connected to the plurality of power stages, the voltage regulator configured to detect an analog temperature signal from the plurality of power stages via a communication line,
the voltage regulator configured to transmit a digital bit stream to the plurality of power stages via the communication line, the digital bit stream including one or more programmable power stage parameters.

10. The power supply system of claim 9, wherein the voltage regulator is configured to transmit the digital bit stream with digital logic levels within a voltage range different from a voltage range used to detect the analog temperature signal.

11. The power supply system of claim 9, wherein the voltage regulator is configured to transmit the digital bit stream before or during the plurality of power stages initiate a power stage start-up operation.

12. The power supply system of claim 9, wherein the voltage regulator is configured to interrupt detection of the analog temperature signal on the communication line, transmit the digital bit stream to the plurality of power stages via the communication line, and resume the detection of the analog temperature signal.

13. The power supply system of claim 9, wherein the voltage regulator is configured to detect the analog temperature signal by detecting a voltage level on the communication line.

14. The power supply system of claim 9, wherein the voltage regulator is configured to re-transmit the digital bit stream to a power stage of the plurality of power stages in response to receipt of a negative acknowledgement message from the power stage during a wait time period set by an electronic timer.

15. The power supply system of claim 9, wherein a power stage of the plurality of power stages is configured to transmit a negative acknowledgement message by decreasing a voltage level on the communication line to be less than a threshold level for a period of time.

16. The power supply system of claim 15, wherein the power stage is configured to transmit the negative acknowledgement message in response to receipt of a portion of the digital bit stream, wherein a length of the period of time indicates identification information of the power stage.

17. A method for transmitting a programmable power stage parameter in a power supply system, the method comprising:
transmitting, by a voltage regulator, a digital bit stream to a plurality of power stages via a communication line, the digital bit stream including one or more programmable power stage parameters, the digital bit stream having digital levels within a first voltage range; and
detecting, by the voltage regulator, an analog temperature signal from the plurality of power stages via the communication line, the analog temperature signal being detected within a second voltage range, the second voltage range being different from the first voltage range.

18. The method of claim 17, further comprising:

setting, by the voltage regulator, a wait time period in response to the digital bit stream being transmitted;

detecting, by the voltage regulator, the analog temperature signal on the communication line during the wait time period;

detecting, by the voltage regulator, a negative acknowledgement message on the communication line during the wait time period; and re-transmitting, by the voltage regulator, the digital bit stream to the plurality of power stages in response to receipt of the negative acknowledgement message.

19. The method of claim 18, wherein the detecting the negative acknowledgement on the communication line includes detecting that a voltage on the communication line is within a third voltage range.

20. The method of claim 17, wherein the digital bit stream is transmitted during operation of the plurality of power stages.

\* \* \* \* \*